United States Patent
Sloane et al.

(10) Patent No.: US 11,539,528 B2
(45) Date of Patent: Dec. 27, 2022

(54) SYSTEM FOR AUTHORIZING SECURED ACCESS USING CRYPTOGRAPHIC HASH VALUE VALIDATIONS

(71) Applicant: Bank of America Corporation, Charlotte, NC (US)

(72) Inventors: Brandon Sloane, Santa Barbara, CA (US); Brian Diederich, Simi Valley, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 329 days.

(21) Appl. No.: 16/806,420

(22) Filed: Mar. 2, 2020

(65) Prior Publication Data
US 2021/0273808 A1    Sep. 2, 2021

(51) Int. Cl.
*H04L 29/06* (2006.01)
*H04L 9/32* (2006.01)
*G06N 20/00* (2019.01)

(52) U.S. Cl.
CPC ........... *H04L 9/3236* (2013.01); *G06N 20/00* (2019.01); *H04L 9/3271* (2013.01)

(58) Field of Classification Search
CPC ... H04L 9/3236; H04L 9/3271; H04L 9/3297; G06N 20/00
See application file for complete search history.

(56) References Cited

U.S. PATENT DOCUMENTS

| | | | |
|---|---|---|---|
| 7,640,338 B2 | 12/2009 | Huitema et al. | |
| 8,677,486 B2 | 3/2014 | Olney et al. | |
| 8,776,229 B1 | 7/2014 | Aziz | |
| 8,793,787 B2 | 7/2014 | Ismael et al. | |
| 8,984,113 B2 | 3/2015 | Li et al. | |
| 9,319,404 B2 | 4/2016 | Svigals | |
| 9,392,018 B2 | 7/2016 | Adams et al. | |
| 9,392,446 B1 | 7/2016 | Paczkowski et al. | |
| 9,485,231 B1 | 11/2016 | Reese | |
| 9,565,192 B2 | 2/2017 | Chillappa et al. | |
| 9,591,016 B1 | 3/2017 | Palmieri et al. | |
| 9,699,659 B2 | 7/2017 | Zehavi et al. | |
| 9,699,814 B2 | 7/2017 | Zakaria et al. | |
| 9,716,595 B1 | 7/2017 | Kravitz et al. | |
| 9,729,528 B2 | 8/2017 | Zakaria et al. | |
| 9,825,921 B2 | 11/2017 | Reese | |
| 2007/0204330 A1* | 8/2007 | Townsley | H04L 9/3271 726/4 |
| 2010/0031315 A1 | 2/2010 | Feng et al. | |
| 2014/0289833 A1* | 9/2014 | Briceno | H04L 9/006 726/5 |
| 2015/0339486 A1 | 11/2015 | Shetye | |

(Continued)

*Primary Examiner* — Mahfuzur Rahman
(74) *Attorney, Agent, or Firm* — Moore & Van Allen PLLC; Seongun M. Hong

(57) ABSTRACT

A system for authorizing secured access using cryptographic hash value validations is provided. In particular, the system may receive requests from users and/or computing systems to obtain secured access a particular resource or to execute a certain process. In response, the system may require that the user and/or computing system complete additional required steps (e.g., a computation) before being granted access to the resources or processes. In this way, the system may prevent unauthorized or unintended access to the system's resources or processes.

14 Claims, 2 Drawing Sheets

(56) References Cited

U.S. PATENT DOCUMENTS

| | | |
|---|---|---|
| 2016/0080413 A1 | 3/2016 | Smith et al. |
| 2016/0173495 A1 | 6/2016 | Joo |
| 2016/0248746 A1 | 8/2016 | James et al. |
| 2016/0352685 A1 | 12/2016 | Park |
| 2016/0366181 A1 | 12/2016 | Smith et al. |
| 2017/0066399 A1 | 3/2017 | Villacres Mesias et al. |
| 2017/0163444 A1 | 6/2017 | McLaughlin et al. |
| 2017/0289184 A1 | 10/2017 | C et al. |
| 2018/0183601 A1 | 6/2018 | Campagna et al. |
| 2019/0164156 A1* | 5/2019 | Lindemann ...... G06Q 20/40145 |
| 2019/0222424 A1* | 7/2019 | Lindemann ........... H04L 9/3231 |
| 2020/0220853 A1* | 7/2020 | Xu ....................... G06F 16/955 |

* cited by examiner

SYSTEM FOR AUTHORIZING SECURED ACCESS USING CRYPTOGRAPHIC HASH VALUE VALIDATIONS

FIELD OF THE INVENTION

The present disclosure embraces a system for authorizing secured access using cryptographic hash value validations.

BACKGROUND

There is a need for a way to prevent unauthorized and/or unintentional execution of processes with high potential impacts on computing systems and/or resources.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for authorizing secured access using cryptographic hash value validations. In particular, the system may receive requests from users and/or computing systems to obtain secured access a particular resource or to execute a certain process. In response, the system may require that the user and/or computing system complete additional required steps (e.g., a computation) before being granted access to the resources or processes. In this way, the system may prevent unauthorized or unintended access to the system's resources or processes.

Accordingly, embodiments of the present disclosure provide a system for authorizing secured access using cryptographic hash value validations. The system may comprise a memory device with computer-readable program code stored thereon; a communication device; and a processing device operatively coupled to the memory device and the communication device. The processing device may be configured to execute the computer-readable program code to receive, from a user computing system, a request execute a process; detect that the process has a high potential impact to one or more networked systems; prompt the user to complete an intent challenge; detect that the user has completed the intent challenge; grant the request to execute the process; and generate a cryptographic hash based on the request to execute the process and the intent challenge.

In some embodiments, the intent challenge requires the user to select an end state of the process.

In some embodiments, the intent challenge scales in difficulty depending on a potential impact of the process.

In some embodiments, detecting that the process has a high potential impact comprises accessing a database of predefined processes with high potential impact.

In some embodiments, detecting that the process has a high potential impact further comprises continuously monitoring processes and outcomes associated with the processes; based on the outcomes associated with the actions, detect, using machine learning, that the process has a high potential impact; and add the process to the database of predefined processes with high potential impact.

In some embodiments, the request to execute the process comprises at least one of a user identifier, a transaction identifier, and a timestamp.

In some embodiments, wherein the computer-readable program code further causes the processing device to perform integrity validations of at least one of the user identifier, the transaction identifier, and the timestamp using the cryptographic hash.

Embodiments of the present disclosure also provide a computer program product for authorizing secured access using cryptographic hash value validations. The computer program product may comprise at least one non-transitory computer readable medium having computer-readable program code portions embodied therein, the computer-readable program code portions comprising executable code portions for receiving, from a user computing system, a request execute a process; detecting that the process has a high potential impact to one or more networked systems; prompting the user to complete an intent challenge; detecting that the user has completed the intent challenge; granting the request to execute the process; and generating a cryptographic hash based on the request to execute the process and the intent challenge.

In some embodiments, the intent challenge requires the user to select an end state of the process.

In some embodiments, the intent challenge scales in difficulty depending on a potential impact of the process.

In some embodiments, detecting that the process has a high potential impact comprises accessing a database of predefined processes with high potential impact.

In some embodiments, detecting that the process has a high potential impact further comprises continuously monitoring processes and outcomes associated with the processes; based on the outcomes associated with the actions, detect, using machine learning, that the process has a high potential impact; and add the process to the database of predefined processes with high potential impact.

In some embodiments, the request to execute the process comprises at least one of a user identifier, a transaction identifier, and a timestamp.

Embodiments of the present disclosure also provide a computer-implemented method for authorizing secured access using cryptographic hash value validations. The computer-implemented method may comprise receiving, from a user computing system, a request execute a process; detecting that the process has a high potential impact to one or more networked systems; prompting the user to complete an intent challenge; detecting that the user has completed the intent challenge; granting the request to execute the process; and generating a cryptographic hash based on the request to execute the process and the intent challenge.

In some embodiments, the intent challenge requires the user to select an end state of the process.

In some embodiments, the intent challenge scales in difficulty depending on a potential impact of the process.

In some embodiments, detecting that the process has a high potential impact comprises accessing a database of predefined processes with high potential impact.

In some embodiments, detecting that the process has a high potential impact further comprises continuously monitoring processes and outcomes associated with the processes; based on the outcomes associated with the actions, detect, using machine learning, that the process has a high potential impact; and add the process to the database of predefined processes with high potential impact.

In some embodiments, the request to execute the process comprises at least one of a user identifier, a transaction identifier, and a timestamp.

In some embodiments, the computer-implemented method further comprises performing integrity validations of at least one of the user identifier, the transaction identifier, and the timestamp using the cryptographic hash.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
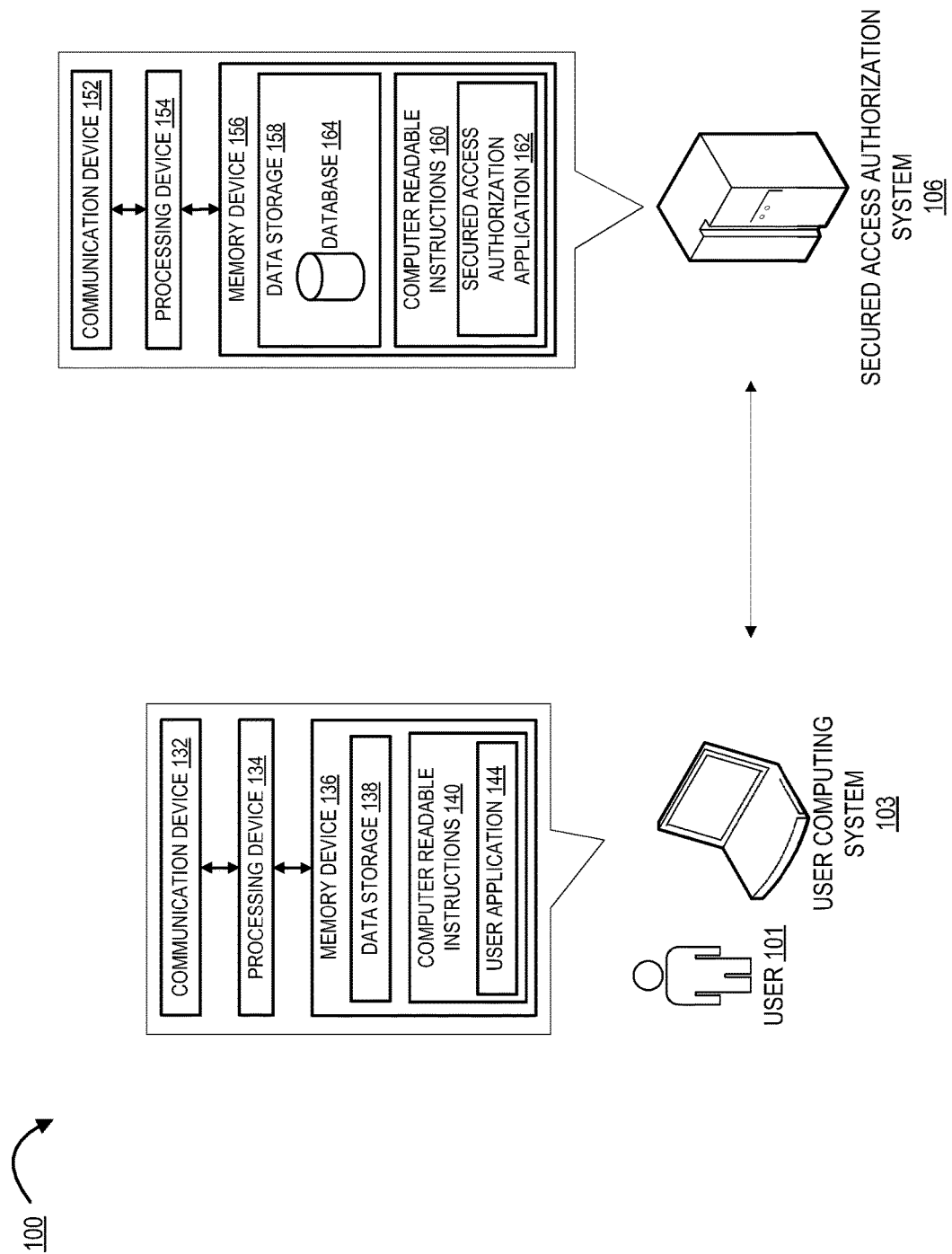
Figure 2:
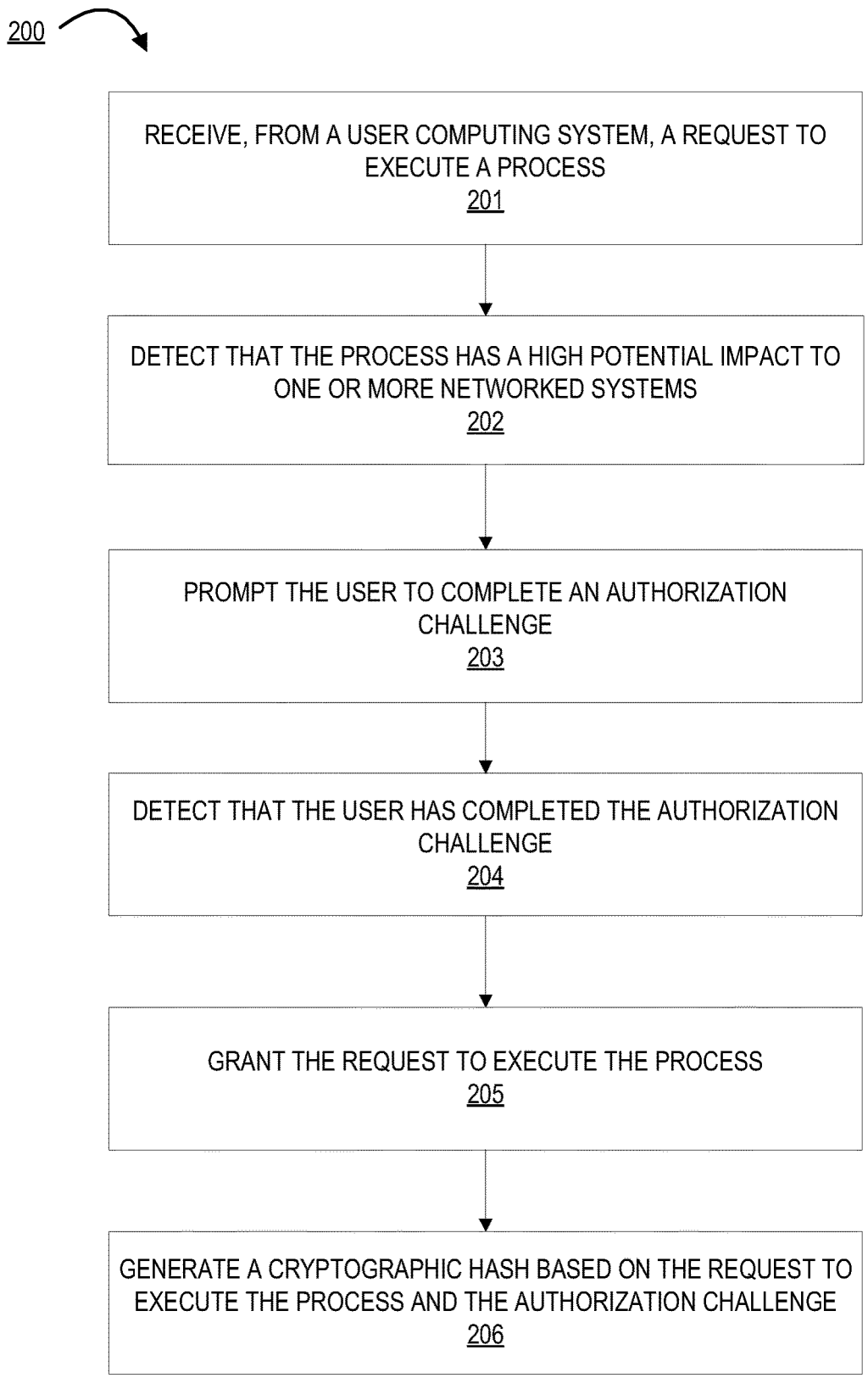

Having thus described embodiments of the invention in general terms, reference will now be made to the accompanying drawings, wherein:

FIG. 1 illustrates an operating environment for the secured access authorization system, in accordance with one embodiment of the present disclosure; and FIG. 2 illustrates a process flow for providing secured access to processes, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Resource" as used herein may refer to physical and virtual objects and/or processes used to accomplish the entity's objectives. In this regard, "resource" may refer to applications, data files, computing systems and/or hardware, computing resources (e.g., processing power, memory space, or the like), computing functions, or the like.

An entity's system may be configured to receive requests from users to execute certain actions or processes within the entity system. For instance, a user may request access to restricted access files which may be stored on a networked server. In other embodiments, the user may request to change classifications and/or permissions for particular other users or groups of users within the entity system. That said, an entity may wish to protect against unauthorized or unintentional access to an entity's resources. In this regard, the system may assess the magnitude of potential impact of the requested action on the entity's systems (e.g., networking load, processing or storage load, potential security issues, potential for data loss, or the like) and, depending on the potential impact, require the user to take one or more additional steps before fulfilling the request. For instance, the system may require the user to complete a computational challenge. In other embodiments, the system may require the user to demonstrate knowledge of the end state of the actions and/or processes requested by the user. In this way, the system may be able to assess the intent of the user and ensure that the user does not take unintentional actions within the entity system that may have significant impact on the security, functionality, or stability of the entity system. Once the user has successfully completed the additional steps, the system may authorize the user to complete the requested action. The process beginning from receiving the request and ending with completing the request may be referred to herein as a "transaction." The system may then generate a hash value based on one or more salt values associated with the transaction (e.g., user identifier, timestamp, transaction identifier, and the like) and subsequently store the generated hash value within a hash database, which may serve as a log of requests processed by the system. The hash values may further be used for integrity validation purposes. For instance, if either the hashed values or the information associated with the hashed values (e.g., salt values) are modified or corrupted, the system may consider the integrity of the log to be compromised.

An exemplary use case is provided below for illustrative purposes. In one embodiment, the system may receive a request from a user to delete a user classification for a user or group of users within the entity system (e.g., deletion of a "power user" classification). In response, the system may assess the potential impact of fulfilling the request. In this regard, the system may comprise a repository of actions or processes considered to have a high potential impact. In some embodiments, the actions or processes classified as having high potential impact may be predefined (e.g., file deletion is predefined as a high potential impact action). In other embodiments, the system may use artificial intelligence and/or machine learning to monitor all requested actions as well as the impact that they have on the system, and subsequently determine which actions correspond to high impacts. For instance, a request to delete a user classification affecting a large number of users may have the potential impact of straining computing resources (e.g., processor usage, memory usage, I/O calls, networking bandwidth, and the like), cause errors and dependency issues, and the like. In this regard, the system may require that the user takes an additional step to demonstrate an intent to complete the requested action. For example, based on information associated with the requested transaction (e.g., user ID, transaction ID, timestamp, and the like), the system may generate a computational challenge and require that the user solve the challenge before further authorization is provided. For example, the computational challenge may require that the user compute the value of 25×36.

Once the user has successfully completed the additional authorization step, the system may proceed with fulfilling the user's request. In some embodiments, the system may, upon detecting that the user has successfully completed the challenge, use the solution to the challenge as a salt value to sign the transaction. In this regard, the system may input the solution along with the information associated with the transaction into a hash algorithm to produce a hash output value corresponding to the transaction. The resulting hash output value may serve as a signature of the transaction which may be stored in a database containing data records of the transactions processed by the system. The hash output value may then allow the system to perform integrity validation of the transaction information. In this way, the system may create a tamper and corruption resistant log of authorizations and transactions processed by the system.

The system as described herein confers a number of technological advantages over conventional authorization systems. In particular, by assessing the potential impact of certain requests to access resources and/or processes, the system may help prevent computing inefficiencies, instabilities, and data loss issues that may result from unauthorized and/or unintended user actions (e.g., accidental deletion of sensitive or operations-critical data).

Turning now to the figures, FIG. 1 illustrates an operating environment 100 for the secured access authorization system, in accordance with one embodiment of the present disclosure. In particular, FIG. 1 illustrates a secured access authorization system 106 that is operatively coupled, via a network, to a user computing system 103. In such a configuration, the secured access authorization system 106 may, in some embodiments, transmit information to and/or receive information from the user computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the user computing system 103 is depicted as a single unit, the system may comprise user computing systems that may each submit requests to and/or receive data from the secured access authorization system 106.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the secured access authorization system 106 may be a computing system that performs authorization of user requests with respect to certain actions or processes to be carried out by the secured access authorization system 106. Accordingly, the secured access authorization system 106 may comprise a communication device 152, a processing device 154, and a memory device 156. The secured access authorization system 106 may be a device such as a networked server, desktop computer, terminal, or any other type of computing system as described herein. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the user computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a secured access authorization application 162, which may comprise computer-executable program code which may instruct the processing device 154 to perform certain logic, data processing, and data storing functions of the application to accomplish the entity's objectives. For instance, the secured access authorization application 162 may allow the entity system to perform the authorization of secured access and/or execution of processes as described elsewhere herein.

In some embodiments, the memory device 156 includes data storage 158 for storing data related to the system environment. In this regard, the data storage 158 may comprise a database 164, which may include various types of data, metadata, executable code, or other types of information or resources regarding transactions processed by the secured access authorization system 106. In an exemplary embodiment, the database 164 may comprise transaction information, hash values, transaction signatures, and the like. It should be understood that in alternative embodiments, the database 164 may be hosted on a separate computing system (e.g., a database server) instead of being hosted on the secured access authorization system 106.

As further illustrated in FIG. 1, the operating environment 100 may further comprise a user computing system 103 in operative communication with the secured access authorization system 106. The user computing system 103 may be a computing system that is operated by a user 101, such as an administrator, agent, or employee of the entity. In other embodiments, the user 101 may be a user which is external to the entity, such as a customer or client of the entity. Accordingly, the user computing system 103 may be a device such as a desktop computer, laptop, IoT device, smartphone, tablet, single-board computer, or the like. The user computing system 103 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The user computing system 103 may comprise a processing device 134 operatively coupled to a communication device 132 and a memory device 136 having data storage 138 and computer readable instructions 140 stored thereon. The computer readable instructions 140 may comprise a user application 144 which may receive inputs from the user 101 and produce outputs to the user 101. In particular, the user application 144 may be used by the user 101 to submit requests for secured access to execute processes provided by the entity (e.g., via the secured access authorization system 106).

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for providing secured access to processes, in accordance with some embodiments of the present disclosure. The process 200 begins at block 201, where the system receives, from a user computing system, a request to execute a process. The user may be, for instance, an employee of administrator of an entity that owns and hosts the system as described herein. In this regard, the user may submit a request for authorized and secured access to take certain actions within the entity system. For example, the user may be a systems administrator of the entity who may submit a request to execute a batch file deletion process within a specified database. For certain actions or processes, the system may require that the user demonstrates clear intent to perform the intended actions before the actions or process are executed, as will be described in further detail below.

The process continues to block 202, where the system detects that the process has a high potential impact to one or more networked systems. In some embodiments, the system may include predefined categories for actions that may be classified as having a high potential impact. An action may have a high potential impact when the consequences of such action may have a high probability of affecting or disrupting the operations, functionality, security, or capabilities of one or more systems within the entity network. For instance, a request to delete a large number of data files within a particular database may greatly affect the functionality of certain systems which may be dependent on the data files to be deleted. Furthermore, the entity may be required to allocate a great amount of resources to replace the deleted data. In this regard, the proposed action may be predefined by the system as having a high potential impact. In some embodiments, the system may use an artificial intelligence-driven process to continuously monitor actions taken by the system in response to user requests. The system may further track the outcomes of each action taken to assess the impact of the actions. The system may then use machine learning to determine which actions have low potential impacts and which ones have high potential impacts. In this way, the system may be able to identify new actions which have high potential impacts and subsequently add the new actions to the predefined list of actions that may require an expression of user intent.

The process continues to block 203, where the system prompts the user to complete an intent challenge. Based on detecting that the request is associated with a high potential impact, the system may issue an intent challenge that requires the user to demonstrate an intent and/or awareness of the end state of the proposed actions associated with the request. In this regard, the intent challenge may include a requirement that the user complete a computational puzzle (e.g., a multiplication problem). In other embodiments, the user may be required to provide the end state of the proposed action. For instance, continuing the above example, if the user wishes to delete a class of users, the system may require the user to provide what the state of the system would be if the class of users is deleted (e.g., what users would be affected, what the status of such users would be, and the like). In this regard, the system may provide multiple snapshots of the system in various states (e.g., configuration of users) and prompt the user to select the snapshot which correctly reflects the end state of the system if the proposed actions are executed. In this way, the system may determine that the intent of the user reflects knowledge of the outcomes and consequences of the proposed actions. In some embodiments, the system may scale the difficulty of the challenge based on the potential impact of the proposed action. For instance, actions with extremely high potential impacts may require a more intensive challenge (e.g., a computation that takes longer to perform) than actions with relatively lower potential impacts.

The process continues to block 204, where the system detects that the user computing system has completed the intent challenge. If the system determines that the user has completed the intent challenge successfully (e.g., the user has provided the correct value for the challenge), the system may continue to block 205, where the system grants the request to execute the process. However, if the system determines that the correct solution has not been provided, the system may reject the request to execute the proposed actions. In some embodiments, the system may generate a new intent challenge and prompt the user to complete the new intent challenge before granting the request to execute the process.

If the system grants the request to execute the process as shown in block 205, the process concludes at block 206, where the system generates a cryptographic hash based on the request to execute the process and the intent challenge. In particular, the system may input various types of information regarding the transaction (e.g., user ID, transaction ID, timestamp, and the like) as well as the intent challenge (e.g., the challenge provided, the solution received, and the like) into a hash algorithm to generate a cryptographic hash value. The hash value, along with the various types of information, may be stored in a database to serve as a log of transactions processed by the system. Accordingly, the hash value may serve as a signature of the transaction that may subsequently be used for integrity validation purposes. For instance, the system may perform the hash calculations on the transaction and intent challenge information at a later date to generate a new hash value, then compare the new hash value with the stored hash value associated with the transaction and intent challenge information. If the values do not match, the system may determine that at least a portion of the transaction and intent challenge information has been modified. By using the process described herein, the system may actively prevent the execution of unauthorized or unintentional processes that may greatly impact the entity system.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authorizing secured access using cryptographic hash value validations, the system comprising:
   a memory device with computer-readable program code stored thereon;
   a communication device; and
   a processing device operatively coupled to the memory device and the communication device, wherein the processing device is configured to execute the computer-readable program code to:
      receive, from a user computing system, a request to execute a process;
      detect that the process has a high potential impact to one or more networked systems, wherein detecting that the process has a high potential impact comprises:
         accessing a database of predefined processes with high potential impact;
         continuously monitoring processes and outcomes associated with the processes;
         based on the outcomes associated with the processes, detecting, using machine learning, that the process has a high potential impact; and
         adding the process to the database of predefined processes with high potential impact;
      prompt the user to complete an intent challenge;
      detect that the user has completed the intent challenge;
      grant the request to execute the process; and
      generate a cryptographic hash based on the request to execute the process and the intent challenge.

2. The system according to claim 1, wherein the intent challenge requires the user to select an end state of the process.

3. The system according to claim 1, wherein the intent challenge scales in difficulty depending on a potential impact of the process.

4. The system according to claim 1, wherein the request to execute the process comprises at least one of a user identifier, a transaction identifier, and a timestamp.

5. The system according to claim 4, wherein the computer-readable program code further causes the processing device to perform integrity validations of at least one of the user identifier, the transaction identifier, and the timestamp using the cryptographic hash.

6. A computer program product for authorizing secured access using cryptographic hash value validations, the computer program product comprising at least one non-transitory computer readable medium having computer-readable program code portions embodied therein, the computer-readable program code portions comprising executable code portions for:
   receiving, from a user computing system, a request to execute a process;
   detecting that the process has a high potential impact to one or more networked systems, wherein detecting that the process has a high potential impact comprises:
      accessing a database of predefined processes with high potential impact;
      continuously monitoring processes and outcomes associated with the processes;
      based on the outcomes associated with the processes, detecting, using machine learning, that the process has a high potential impact; and
      adding the process to the database of predefined processes with high potential impact;
   prompting the user to complete an intent challenge;
   detecting that the user has completed the intent challenge;
   granting the request to execute the process; and
   generating a cryptographic hash based on the request to execute the process and the intent challenge.

7. The computer program product according to claim 6, wherein the intent challenge requires the user to select an end state of the process.

8. The computer program product according to claim 6, wherein the intent challenge scales in difficulty depending on a potential impact of the process.

9. The computer program product according to claim 6, wherein the request to execute the process comprises at least one of a user identifier, a transaction identifier, and a timestamp.

10. A computer-implemented method for authorizing secured access using cryptographic hash value validations, wherein the computer-implemented method comprises:
   receiving, from a user computing system, a request to execute a process;
   detecting that the process has a high potential impact to one or more networked systems, wherein detecting that the process has a high potential impact comprises:
      accessing a database of predefined processes with high potential impact;
      continuously monitoring processes and outcomes associated with the processes;
      based on the outcomes associated with the processes, detecting, using machine learning, that the process has a high potential impact; and
      adding the process to the database of predefined processes with high potential impact;
   prompting the user to complete an intent challenge;
   detecting that the user has completed the intent challenge;
   granting the request to execute the process; and generating a cryptographic hash based on the request to execute the process and the intent challenge.

11. The computer-implemented method according to claim 10, wherein the intent challenge requires the user to select an end state of the process.

12. The computer-implemented method according to claim 10, wherein the intent challenge scales in difficulty depending on a potential impact of the process.

13. The computer-implemented method according to claim 10, wherein the request to execute the process comprises at least one of a user identifier, a transaction identifier, and a timestamp.

14. The computer-implemented method according to claim 13, wherein the computer-implemented method further comprises performing integrity validations of at least one of the user identifier, the transaction identifier, and the timestamp using the cryptographic hash.

* * * * *